M. SCHWARTZ.
WEIGHING SCALE.
APPLICATION FILED JUNE 8, 1908.

918,777.

Patented Apr. 20, 1909.
3 SHEETS—SHEET 1.

Witnesses:
John Enders
Chas. H. Buell

Inventor:
Morris Schwartz
By Dyrenforth, Lee, Chritton & Wiles
Attys.

M. SCHWARTZ.
WEIGHING SCALE.
APPLICATION FILED JUNE 8, 1908.

918,777.

Patented Apr. 20, 1909.
3 SHEETS—SHEET 2.

Witnesses:
John Enders
Chas. H. Buell

Inventor:
Morris Schwartz.
By Dyrenforth, Lee, Chritton & Wiles
Attys.

M. SCHWARTZ.
WEIGHING SCALE.
APPLICATION FILED JUNE 8, 1908.

918,777.

Patented Apr. 20, 1909.
3 SHEETS—SHEET 3.

Witnesses:
John Enders
Chas. H. Buell

Inventor:
Morris Schwartz
By Dyrenforth, Lee, Chritton & Wiles
Attys.

UNITED STATES PATENT OFFICE.

MORRIS SCHWARTZ, OF CHICAGO, ILLINOIS, ASSIGNOR TO AMERICAN CUTLERY COMPANY, OF CHICAGO, ILLINOIS, A CORPORATION OF ILLINOIS.

WEIGHING-SCALE.

No. 918,777.  Specification of Letters Patent.  Patented April 20, 1909.

Application filed June 8, 1908. Serial No. 437,269.

*To all whom it may concern:*

Be it known that I, MORRIS SCHWARTZ, a citizen of the United States, residing at Chicago, in the county of Cook and State of Illinois, have invented a new and useful Improvement in Weighing-Scales, of which the following is a specification.

My invention relates, more particularly, to the variety of scales for weighing comparatively light articles, and comprising, in general, an upright standard carrying the article-support, a dial on the front of the scale-casing, a pointer for the dial carrying a pinion, and means operated by the article-support for actuating the pinion.

Heretofore, so far as I am aware, the construction of scales of this type has been such as to render impossible, under all conditions, the accurate weighing of articles placed on the scale, especially should the article be placed on the article-support in such a position as to cause the latter to tilt, this result being caused by the transmission of lost-motion in the lever-bearings to the rack engaging with the pointer-pinion. Another objectionable feature of scales, as hitherto provided, is that the rack engaging with the pointer-pinion is so constructed and connected with the operating mechanism of the scale that it is caused to be moved in an arc-shaped path, and thus in moving shifts sidewise on the pinion instead of operating throughout its movement against the pinion at a given point intermediate the ends of the pinion, thereby producing such a degree of friction as prevents accurate weighing.

My primary object is to overcome these objections, and to provide a construction by which shifting of the rack endwise of the pointer-pinion is avoided, and accurate weighing of articles may be effected, regardless of the position in which the article is placed on the weighing platform.

Referring to the accompanying drawings—

Figure 1:
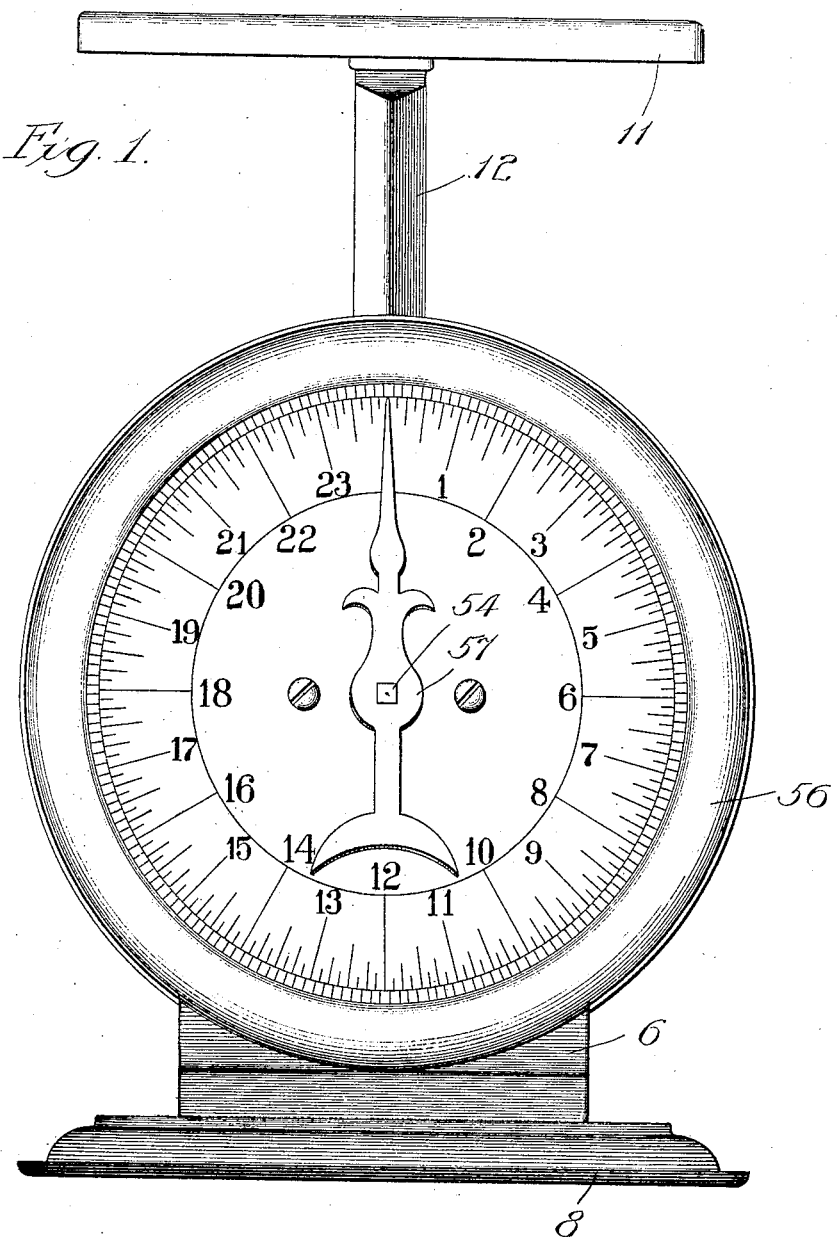
Figure 2:
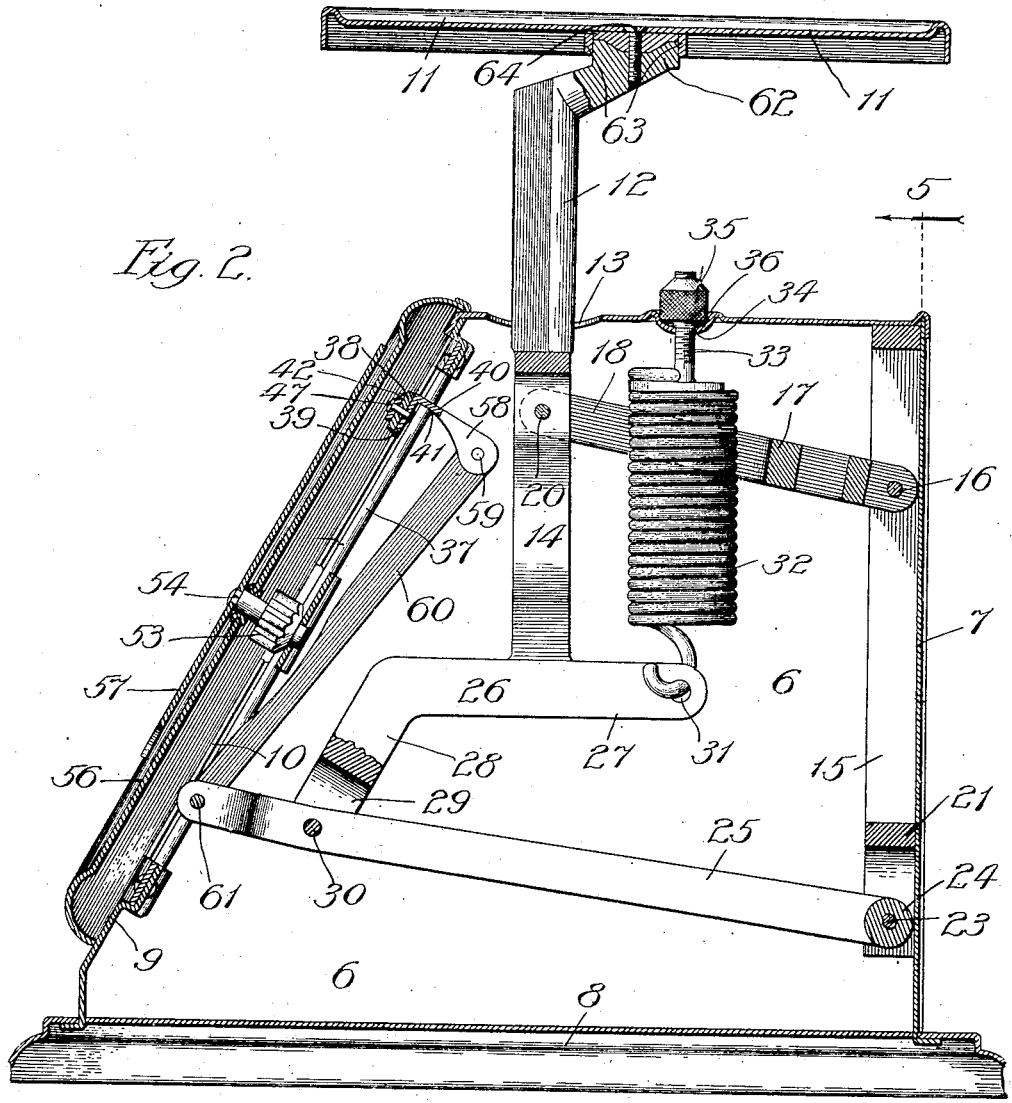
Figure 3:
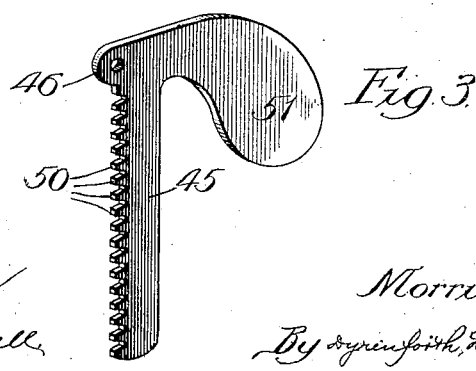
Figure 4:
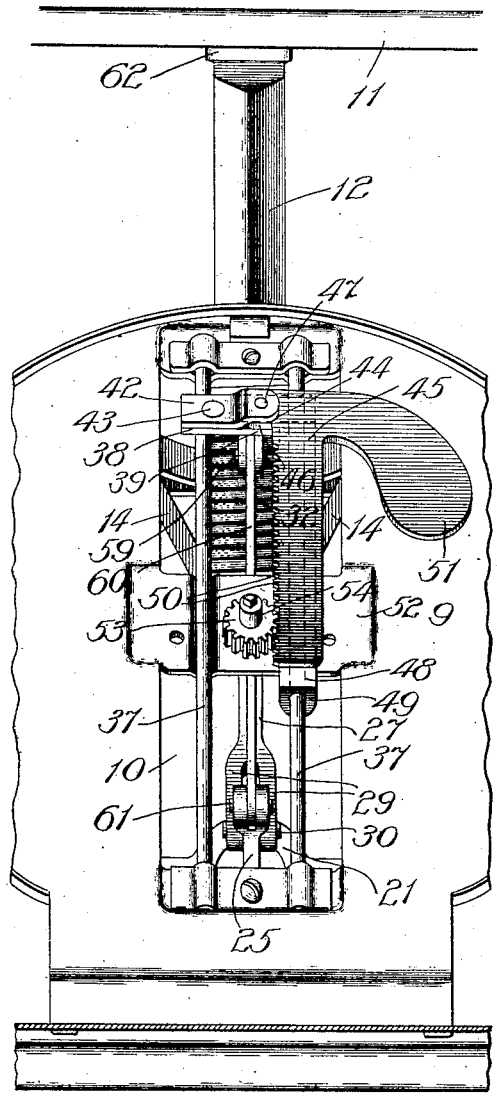
Figure 5:
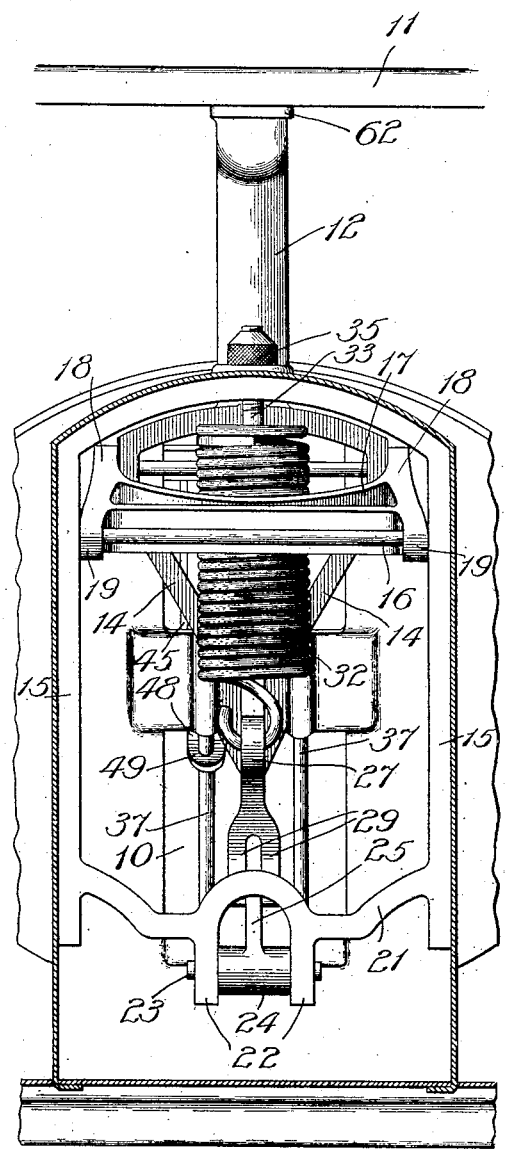

Figure 1 represents by a view in front elevation a scale of the slanting-dial type constructed in accordance with my invention. Fig. 2 is a view in longitudinal sectional elevation of the scale illustrated in Fig. 1. Fig. 3 is a perspective view of the rack-bar employed. Fig. 4 is a broken view in front elevation of the scale with the dial and pointer removed; and Fig. 5 is a section taken at the line 5 on Fig. 2, and viewed in the direction of the arrow.

The casing of the scale which is represented at 6, affords a removable rear side 7, a base 8 and a slanting dial-supporting member 9 which latter, as illustrated, contains a vertically elongated slot 10 which extends to within a short distance of the top and bottom of the member 9.

The platform 11 is carried on the upper end of a vertically reciprocable standard 12 which extends through an opening 13 in the top of the casing 6 and is of yoke-shape at its lower end-portion, affording arms 14 which converge downwardly as represented. Secured in the casing, near its rear end, is an upright inverted U-shaped frame 15, in the upper end-portion of which is journaled a rod 16 to which a slightly upwardly-inclined, forwardly extending frame 17 of yoke-shape affording spaced arms 18 is fixed at lugs 19 thereon, the forward ends of the arms 18 embracing between them the yoke-frame 14 at which points the arms 18 and frame 14 are pivoted together, as represented at 20.

The lower ends of the frame 15 support a rigid cross-bar 21 affording two spaced depending lugs 22 intermediate its ends, between which lugs and a rod 23 secured therein the rear headed end 24 of a forwardly-extending lever-arm 25 approximately paralleling the frame 17, is journaled. The lower ends of the frame-arms 14 are rigidly fastened to an arm 26 on opposite sides of its horizontal portion 27 between the ends of the latter, the forward downwardly inclined end 28 of the arm 26 being bifurcated to present depending arms 29, which embrace and pivotally connect with the lever-arm 25 near its forward end, as represented at 30. The rear end of the arm 27 is connected at an opening 31 therein with the lower end of a vertically disposed coiled spring 32, which is connected near its upper end, in any suitable manner, to the lower end of a threaded rod 33, which extends upward through an opening 34 in the top of the casing 6 and carries beyond this casing an adjusting screw 35 seating in a depression 36 in the casing top.

The dial-supporting member 9 has secured to it to extend longitudinally through the slot 10 a pair of parallel spaced guide-rods 37 upon which is slidably confined to be reciprocable up and down, a cross-head 38 of angular shape in cross-section affording a depending lip 39 and a rearwardly extending flange 40 through openings 41 in which the rods extend. The front face of the lip 39 has a plate 42 rigidly secured to it at one end as by the rivet 43, the outer free end of this plate being flanged as represented at 44, between which flange and the lip 39 a rack-bar 45 is pivoted at a lug 46 thereon, as indicated at 47 near one end of an upper corner thereof, to lie flatwise against a guide-plate 48 depending from the cross-head 38 and in the rear of the bar 45, and having a rearwardly extending flange 49 at its lower end through which the adjacent one of the rods 37 passes for supplementing the guiding action on the cross-head 38 at its flange 40. The bar 45 has rack-teeth 50 on one of its lateral edges and carries near its upper end on its opposed lateral edge an extension 51 which serves as a weight tending to swing the bar 45 upon its pivot 47 in a direction to the left in Fig. 4.

The member 9 is provided centrally with a rib 52 which spans the slot 10 intermediate its ends, and journaled in this rib is a pinion 53 which extends at a stub-shaft 54 thereon through the central opening 55 in the dial-plate 56, of usual construction, and carries a pointer 57.

The pinion 53 is caused to be engaged by the teeth 50 on the rack-bar 45 by pivoting the latter and weighting it as described, so that it will tend to swing toward the pinion, it being designed that these parts be so constructed as to cause the teeth on the bar 45 to bear against the teeth on the pinion 53 with as slight pressure as is consistent with positive engagement of the rack with the pinion.

The flange 40 of the cross-head 38 has two rearwardly extending lugs 58 between which is pivoted, as represented at 59, the upper end of the link 60, the lower end of this link being pivotally connected with the extreme bifurcated forward end of the lever-arm 25, as represented at 61.

The operation of the scale is as follows: An article to be weighed placed on the platform causes the standard 12 to be depressed against the resistance of the spring 32, the frame 17 and lever-arm 25 rocking at their pivotal connections with the arms 14 and 29 respectively and with the frame 15. The arm 25 is thus caused to be depressed at its forward end with the result of drawing down the cross-head 38 upon the guide-rods 37, and with this head the rack-bar 45 which latter, in engaging with the pinion 53 as before described, causes the latter to turn, thereby moving the pointer.

It will be understood that the spring 32 is so adjusted by manipulating the screw 35 that the pointer will be operated, when an article is placed on the platform 11, to indicate on the dial the exact weight of the article.

It will be noted that the rack-bar in moving in engagement with the pinion presents its teeth at right-angles to the teeth on the latter, and that the rack-bar does not shift lengthwise on the pinion, but is maintained at all times in engagement with it at a given point intermediate the ends of the pinion, and thus the operation of these parts is performed with minimum resistance as compared with the operation of corresponding parts in constructions in which the rack-bar is caused to travel in a curved path. Furthermore, any lost-motion existing in the pivotal connections of the lever-mechanism intermediate the platform - standard and cross - head carrying the pinion - engaging rack, is not communicated to the rack-bar, as the latter is positively guided and maintained in true alinement by engagement with the rods 37, and thus any tipping of the scale-platform, which, if the connections of the intermediate lever-mechanism were loose for any cause, would not affect the operation of the pointer, and the scale therefore accurately indicates the weight of the article being weighed.

The platform 11 may be secured to the standard 12 in any suitable manner, but as it is desired that the connection be such that the edges of the platform, which is usually square, be maintained in fixed position at all times, I form a square head 62 on the upper end of the standard 12 and provide on the under side of the platform depending flanges 63 forming a rectangular socket for receiving the square-head 62 on the standard, the parts being united together in the usual way by a screw 64.

The expression "spring-supported means" occurring in certain of the claims refers to that part of the scale which is composed of the standard 12, the levers directly fulcrumed thereto, and the spring 32, though I do not wish to be understood by the use of the said term as limiting my invention to its embodiment in a scale in which the lever mechanism last-above referred to, or similar thereto, is employed, as any other suitable spring-supported means for affording to the standard the proper guidance in its movement may be employed and still be within the spirit of my invention as claimed.

What I claim as new, and desire to secure by Letters Patent, is—

1. In a slanting-dial weighing-scale, the combination with a casing carrying a slanting dial, spring-supported means for receiving the articles to be weighed, a pointer for indicating the weight on said dial, and a pinion connected with said pointer, of a rack engaging with said pinion, a guide for the rack in its movements constructed and arranged to cause the latter to travel in a straight path when operated, and a flexible connection between said support and rack, for the purpose set forth.

2. In a slanting-dial weighing-scale, the combination with a casing carrying a slanting dial, spring-supported means for receiving the articles to be weighed, a pointer for indicating the weight on said dial, and a pinion connected with said pointer, of a guide, a rack slidable on said guide and engaging at its teeth with said pinion, and a link carried by said support and having flexible operative connection with said rack for operating it, for the purpose set forth.

3. In a slanting-dial weighing-scale, the combination with a casing carrying a slanting dial, spring-supported means for receiving the articles to be weighed, a pointer for indicating the weight on said dial, and a pinion connected with said pointer, of a guide-rod, a rack slidable on said rod and engaging at its teeth with said pinion, and a link carried by said support and having flexible operative connection with said rack for operating the latter, for the purpose set forth.

4. In a weighing-scale, the combination with the support for the articles to be weighed, a pointer for indicating the weight, and a pinion connected with the pointer, of a guide, a head slidable on said guide and carrying a guide-plate, a rack-bar pivoted on said head bearing at its teeth against the pinion and bearing at a face thereof against said plate, and means constructed and arranged to be operated by the movement of said support for operating said head, for the purpose set forth.

5. In a weighing-scale, the combination with the support for the articles to be weighed, a pointer for indicating the weight, and a pinion connected with the pointer, of a guide, a head slidable on said guide, a rack-bar pivoted near its upper end on said head and provided with an extension at a point causing the bar to be swung toward the pinion and be held in engagement therewith, and means constructed and arranged to be operated by the movement of said support for operating said head, for the purpose set forth.

6. In a weighing-scale, the combination with the support for the articles to be weighed, a pointer for indicating the weight, and a pinion connected with the pointer, of a guide formed of parallel bars, a head slidably connected with said bars near its upper end and having a depending guide-plate slidably engaging one of said bars, a rack-bar pivoted to said head bearing flatwise against the guide-plate and engaging at its teeth with the teeth on the pinion, and means constructed and arranged to be operated by the movement of said support for operating said head, for the purpose set forth.

7. In a weighing-scale, the combination with the support for the articles to be weighed, a pointer for indicating the weight, and a pinion connected with the pointer, of a guide, a rack slidable on said guide and engaging at its teeth with said pinion, pivotally supported lever-mechanism with which said support is connected, a spring for yieldingly holding said support in raised position, and a link connected with said lever-mechanism and said rack, for the purpose set forth.

8. In a weighing-scale, the combination with the support for the articles to be weighed, a pointer for indicating the weight, and a pinion connected with the pointer, of a rack slidable on said guide and engaging at its teeth with the pinion, a pair of substantially parallel horizontal lever-frames pivoted to the casing, a standard carrying said support and pivoted to said frames, a spring tending to hold said frames and standard in raised position, and a link pivotally connected with one of said frames and with the rack for the purpose set forth.

9. In a weighing-scale, the combination with the support for the articles to be weighed, a pointer for indicating the weight, and a pinion connected with the pointer, of a guide, a rack slidable on said guide and engaging at its teeth with said pinion, a series of rock-levers to which said support is connected, a spring for yieldingly holding said support in raised position, and a link connected with said rock-lever mechanism and pivoted to said rack, for the purpose set forth.

10. In a slanting-dial weighing-scale, the combination with a casing carrying a slanting dial, a support for articles to be weighed, a pointer for indicating the weight on said dial, and a pinion connected with said pointer, of a guide, a head slidably supported on said guide in a manner to cause said head to travel in a straight path when operated, a rack carried by said head and engaging at its teeth with said pinion, and a link carried by said support and having flexible operative connection with said rack for operating the latter, for the purpose set forth.

11. In a weighing-scale, the combination with a standard for receiving the articles to be weighed, a pointer for indicating the weight, and a pinion connected with the pointer, of a guide-rod, a rack slidable on said rod and engaging at its teeth with said pinion, pivotally supported lever mechanism with which said standard is connected, means for yieldingly holding said standard in raised position, and a link connected with said lever mechanism and serving to operate said rack, for the purpose set forth.

12. In a weighing-scale, the combination with the support for the articles to be weighed, a pointer for indicating the weight, and a pinion connected with the pointer, of a guide-rod, a member slidable on said guide-rod and positively guided thereby, a rack carried by said member and engaging with said pinion, pivotally supported lever mechanism with which said support is connected, means for yieldingly holding said support in raised position, and a link flexibly connected with said member and with said lever mechanism, for the purpose set forth.

MORRIS SCHWARTZ.

In presence of—
W. B. DAVIES,
R. A. SCHAEFER.